United States Patent
Kale et al.

(10) Patent No.: US 7,917,481 B1
(45) Date of Patent: Mar. 29, 2011

(54) FILE-SYSTEM-INDEPENDENT MALICIOUS CONTENT DETECTION

(75) Inventors: Sanjay Ramchandra Kale, Pune (IN); Kuldeep Sureshrao Nagarkar, Pune (IN); Abhay Harishchandra Marode, Maharashtra (IN); Michael P. Spertus, Wilmette, IL (US)

(73) Assignee: Symantec Operating Corporation, Mountain View, CA (US)

( * ) Notice: Subject to any disclaimer, the term of this patent is extended or adjusted under 35 U.S.C. 154(b) by 91 days.

(21) Appl. No.: 11/529,069

(22) Filed: Sep. 28, 2006

Related U.S. Application Data (63) Continuation-in-part of application No. 11/262,567, filed on Oct. 31, 2005.

(51) Int. Cl.
*G06F 17/30* (2006.01)
*G06F 15/16* (2006.01)

(52) U.S. Cl. .......... 707/693; 707/822; 707/952; 726/24

(58) Field of Classification Search .................. 713/152; 707/101
See application file for complete search history.

(56) References Cited

U.S. PATENT DOCUMENTS

| | | | |
|---|---|---|---|
| 5,410,692 A | 4/1995 | Torres | 707/3 |
| 5,854,916 A * | 12/1998 | Nachenberg | 703/21 |
| 5,907,672 A | 5/1999 | Matze et al. | 714/8 |
| 6,415,300 B1 | 7/2002 | Liu | 707/204 |
| 6,606,651 B1 | 8/2003 | Linde | 709/216 |
| 6,711,558 B1 | 3/2004 | Indeck et al. | 707/1 |
| 6,802,028 B1 * | 10/2004 | Ruff et al. | 714/38 |
| 2003/0131253 A1 * | 7/2003 | Martin et al. | 713/200 |
| 2004/0010732 A1 | 1/2004 | Oka | 714/13 |
| 2004/0078636 A1 | 4/2004 | Suzaki | 714/6 |
| 2004/0107225 A1 | 6/2004 | Rudoff | 707/204 |
| 2005/0132184 A1 | 6/2005 | Palliyil et al. | 713/152 |
| 2006/0136720 A1 * | 6/2006 | Armstrong et al. | 713/164 |
| 2006/0179061 A1 * | 8/2006 | D'Souza et al. | 707/10 |

* cited by examiner

*Primary Examiner* — Tony Mahmoudi
*Assistant Examiner* — Brittany N McCue
(74) *Attorney, Agent, or Firm* — Campbell Stephenson LLP

(57) ABSTRACT

The present invention enables a large number of files to be processed for evidence of malicious content, independently of the file system that maintains the files. The processed files can be obtained from live data or a point-in-time copy (e.g., a snapshot) of the data, based on mapping information that maps the files to the physical storage device. In one embodiment, a method involves accessing mapping information corresponding to a set of data. The mapping information maps at least a portion of a file to a physical storage location. The portion of the file can be read from the physical storage location using the mapping information, without accessing a file system. The portion of the file can then be analyzed for evidence of malicious content.

9 Claims, 6 Drawing Sheets

FILE-SYSTEM-INDEPENDENT MALICIOUS CONTENT DETECTION

CROSS REFERENCE TO RELATED APPLICATION

This application is a continuation-in-part of U.S. patent application Ser. No. 11/262,567, entitled "Optimized Content Search of Files," filed Oct. 31, 2005, and naming as inventors Sanjay Ramchandra Kale, Kuldeep Sureshrao Nagarkar, and Abhay Harischchandra Marode, which is incorporated by reference in its entirety for all purposes as if completely and fully set forth herein.

FIELD OF THE INVENTION

This application relates to data storage and, more particularly, to detecting malicious content of stored data.

BACKGROUND

Malicious content such as viruses infects files and uses vulnerabilities of programs that interpret the infected files to propagate. For example, a virus program may be sent to a user as an attachment to an e-mail message. When the user uses his e-mail program to open the attachment, the virus is triggered and uses the e-mail system to propagate to other computer systems within the network. A virus may also function to erase data or otherwise interfere with the desired operation of a computer system or network.

Malicious content such as viruses is typically detected by means of signature files. Signature files contain instructions and/or information that can be used by a detection program (e.g., an antivirus program) when analyzing a file for the presence of malicious content. Detection programs can employ various detection techniques, including scanning files for a pattern, decompressing code, executing the file in a virtual machine, and the like. For example, one technique can involve scanning a file for a pattern that includes a string of characters, binary computer code, data embedded within a virus, or the like. A detection program is an application program that uses one or more signature files to determine whether malicious content is present in any specified files. If infected files are identified by the detection program, a repair application program may be used to repair the infected files.

Many modern detection techniques do not require reading all the bytes of a file. Not needing to read files in their entirety can result in significant time savings when very large files are being processed by a detection program. Today's detection algorithms may examine only portions of a given file for evidence of malicious content. If an initial investigation indicates that further examination is warranted, the entire file may be evaluated.

Most computer systems in which detection programs operate use an underlying file system. The file system provides a "layer" of software in the computer system to manage storage space for the files. This layer is between the operating system (which communicates directly with devices) on the computer system hosting the file system and an application program that uses the data in the files. Typically, a detection program, such as the detection program described above, calls a read interface provided by the file system to read the files in preparation for performing a search. The detection program provides the name of the file(s) to read, and the file system determines the physical locations on the device(s) storing the files, reads the data from those physical locations, and presents files to be searched to the detection program. The detection program typically then performs the search of the files provided by the file system on a file-by-file basis.

Using a file system to scan files provides some advantages. For example, data for a given file may be stored in several non-contiguous storage locations on a storage device. The file system handles assembly of the files from the data in these non-contiguous storage locations and provides a copy of the files to the detection program. However, this service comes at a cost, as overhead introduced by the file system in constructing files can significantly affect the time and resources required to perform a search. In addition, the file system may itself be compromised by malicious content and thus may be unavailable or unreliable for use in the detection of malicious content.

Additional overhead is incurred when a file system is used to read files and those files share data blocks. Many file systems make some use of a technique called "single-instancing" whereby data blocks (or even entire files) having identical contents are stored only once. Although the file system may provide the appearance that many different files or data blocks just happen to have identical contents, only one copy is actually stored. Single-instance storage can be used, for example, when backup copies of primary production data are made periodically to "freeze" images of the data at given points in time. These backup copies can be used to recover from failure of a computer system, storage device, or network. To save storage space, often data that is the same in the primary production data and in the backup copy is stored only once, along with information that will enable the primary data and/or the backup copy to be reconstructed in the event of failure or corruption of the data. Another use of single-instance storage is when several users share the same storage volume. Many of the users may maintain personal copies of the same file. Whenever this situation arises, the file system can make use of single-instancing to only store a single copy of the file, which is shared among users.

Unfortunately, when an application such as a detection application needs to process a set of files that make use of single-instancing, the file system typically treats the information in the shared storage locations as part of each file that includes the data stored in those shared storage locations. This in turn means that resources are needlessly expended to read the shared storage locations once for each individual file that includes the data stored therein. For file systems managing very large files, this duplicative effort can be very time-consuming and adds overhead to searching of the files.

A solution is needed to enable malicious content detection to be performed quickly and efficiently, with a minimum amount of duplicate effort. Preferably, such a solution can take advantage of existing storage management tools but avoid unnecessary overhead to analyze whether malicious content is present.

SUMMARY OF THE INVENTION

The present invention enables a large number of files to be processed for evidence of malicious content, independently of the file system that maintains the files. The processed files can be obtained from live data or a point-in-time copy (e.g., a snapshot) of the data, based on mapping information that maps the files to the physical storage device. If evidence of malicious content is found in a file from a snapshot, an inference can be made that the live set of data also contains malicious content.

In one embodiment, a method involves accessing mapping information corresponding to a set of data. The mapping information maps at least a portion of a file to a physical storage location. The portion of the file can be read from the physical storage location using the mapping information, without accessing a file system. The portion of the file can then be analyzed for evidence of malicious content.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items. For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

DETAILED DESCRIPTION

Figure 1:
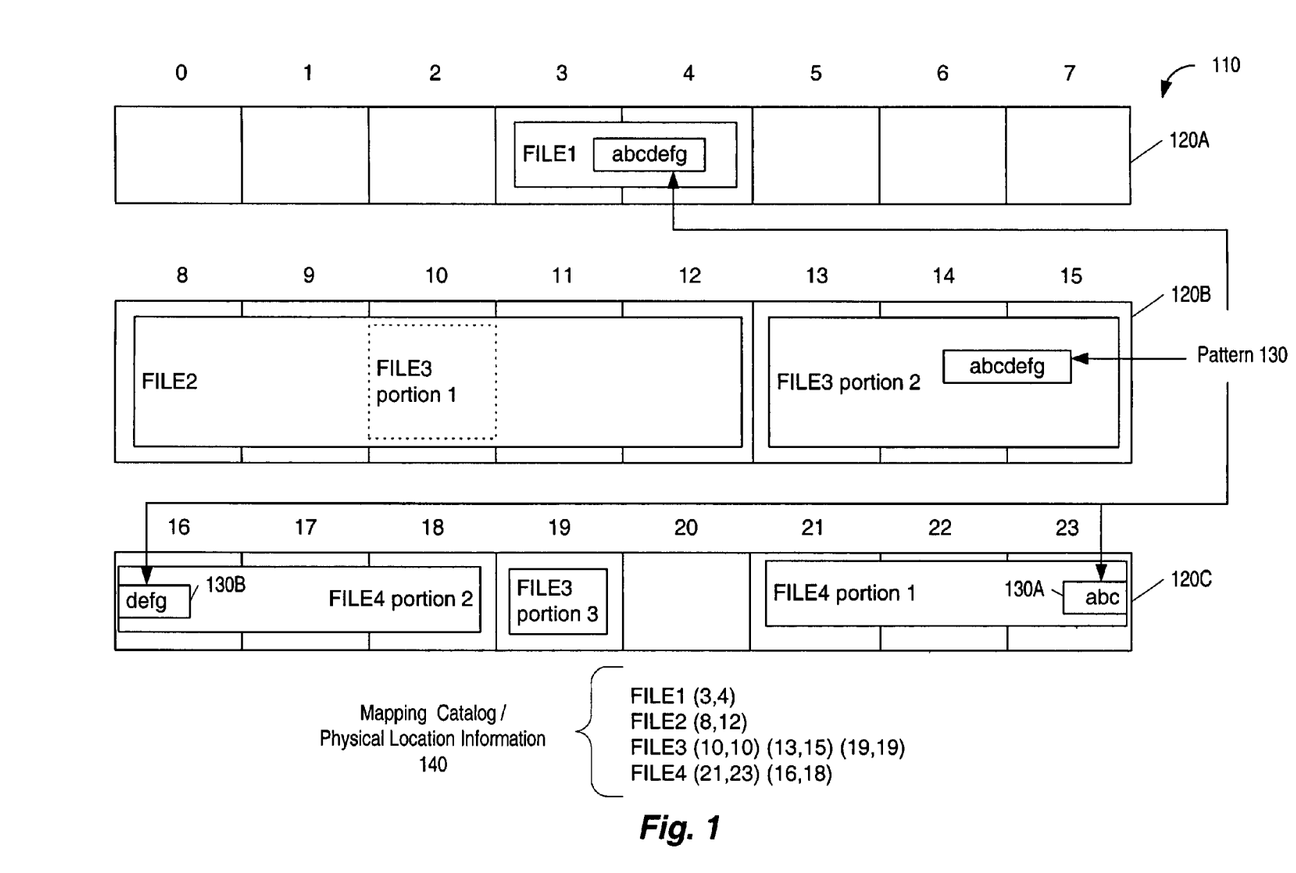
FIG. 1 shows an example of file data stored in a set of storage locations.

FIG. 1 shows an example of file data stored on a storage device 110. File data like that shown in FIG. 1 can be scanned by scanning programs (e.g., a detection program, a pattern detecting program, or the like). Such scanning programs read and scan all or part of a file in order to come to some conclusion about the file (e.g., a conclusion as to whether a file contains a particular pattern or malicious content). A scanning program reads a file in a prespecified order (e.g., as specified by an algorithm), which can include linear scanning, scanning parts of the file in execution order, and the like.

A detection program is a type of scanning program that processes a file in order to determine whether a malicious content is present within the file. Examples of malicious content include a virus, trojan, root kit, or other type of malicious content that is unauthorized and/or likely to disrupt desired system operation. For simplicity, the below examples describe how a detection program can process files. However, other scanning programs can also process files in similar manner in order to come to conclusions that do not involve the presence or absence of malicious code.

Storage device 110 includes 24 contiguous storage locations, numbered 0 through 23. The number of storage locations in FIG. 1 is provided as an example; the description applies to storage devices having any number of storage locations. Furthermore, the example is not intended to indicate a particular size for a given storage location; different systems may have different units of storage and the example is intended to describe storage locations in general. In FIG. 1, storage locations 0 through 23 are shown as organized into three contiguous sets, set 120A containing storage locations 0 through 7, set 120B containing storage locations 8 through 15, and set 120C containing storage locations 16 through 23.

A detection program can process file data, such as that stored in storage locations 0 to 23, to determine whether malicious content is present. In order to process the file data, the detection program needs to access at least a portion of each of several files. In this example, a detection program detects malicious content by accessing at least a portion of a file and then searching the accessed file data for a particular pattern, such as pattern 130 containing the text string 'abc-defg.'

In other embodiments, a detection program can process files in another manner, as directed by one or more signature files. For example, the detection program can execute executable files in a virtual machine. In one embodiment, executing an executable file in a virtual machine involves by reading portions of the file in execution order, and then after reading each portion, updating state information, such as a simulated registry, to reflect the effect of executing the previous portion. The state of the virtual machine can be saved before (this state is the entry state) and/or after (this state is the exit state) processing each portion of the file, in order to save time if that portion of the file is processed again. For example, if the detection program later needs to process that portion of the file again (e.g., if, due to single instancing, that portion of the file is included in more that one file), the detection program can access saved entry and exit state information associated with that portion of the file. If the saved entry state is the same as the current entry state, the detection program can skip processing the portion of the file and simply update the current exit state to equal the saved exit state. It is noted that a given portion of a file, may be associated with several different saved entry states (and a corresponding saved exist state for each entry point). When the portion of the file is later to be analyzed, the current entry state can be compared to the saved entry states; if a match is found, the saved exit state corresponding to the matching saved entry state can be used as the current exit state.

When accessing a file (e.g., in order to be able to search for a pattern within that file, to execute that file, or the like), the detection program typically provides the names of selected files, and the file system then provides those files to the detection program. The detection program then processes the file as desired. In this example, the detection program searches the files for pattern 130.

To manage the files stored on storage device 110, the file system maintains information such as that shown in mapping catalog/physical location information 140. Data are shown for four files named FILE1, FILE2, FILE3, and FILE4. The physical location information for each file is shown as a set of tuples, where each tuple is in the form of (start location, end location). The form of the physical location information for each file may differ between file systems, but a file system provides the functionality to identify storage locations that contain data for a given file. In the example of FIG. 1, FILE1 has data in storage locations 3 and 4, as indicated by tuple (3, 4). Alternatively, physical location information may be represented by a tuple containing a number of contiguous locations beginning with the start location for the respective file. An alternative tuple format of (start location, number of locations), such as (3, 2), would indicate that two storage locations are part of FILE1 beginning at start location 3. If multiple files share the same data (e.g., if single-instancing is implemented), the physical location information for those files will each contain some of the same information. For example, since storage location 10 stores data that is part of two files, both files' physical location information could include tuple (10, 10) (alternatively, each file could include tuples that identify storage location 10 as being within the range identified by the respective tuples). Other formats of mapping catalogs and/or physical location information may also be used.

Referring again to FIG. 1, data for FILE2 are stored in contiguous storage locations 8 through 12 of storage device 110. FILE2 and FILE3 share one storage location, location 10, as shown by the dotted lines for FILE3 portion 1. FILE2 and FILE3 may share a storage location if, for example, FILE2 is a copy of an earlier version of FILE3 (e.g., the shared storage location can store data that is common to both FILE2 and FILE3). In addition to storage location 10, the remainder of FILE3 is found in storage locations 13-15 of set 120B (portion 2) and location 19 of set 120C (portion 3). As shown, a single file, like FILE3, may have data in many non-contiguous locations on the storage device. Since a significant amount of overhead is incurred when accessing the data at each different location, the time needed to process a file to detect malicious content increases with the number of different non-contiguous locations that must be read to construct the file.

In FIG. 1, FILE4 is another example of a file for which data are stored in non-contiguous storage locations. A first portion of FILE4 is found in storage locations 21-23 of set 120C, and a second portion is found in storage locations 16-18 of set 120C. When the first and second portions of FILE4 are combined, pattern 130 appears in the file (as shown by partial patterns 130A and 130B). A search for pattern 130 of all files shown in FIG. 1 shows that pattern 130 (the text string 'abc-defg') is found in FILE1, FILE3, and FILE4.

Assuming that FILE2 is processed before FILE3, the detection program can save its entry and exit states when processing storage location 10 when processing FILE2 (these states can be stored for all storage locations or for only those storage locations identified as containing single-instanced data that are shared by multiple files). Later, when processing FILE3, the detection program can recognize that storage location has already been processed. The detection program can compare its current entry state prior to reading and processing storage location 10 to the saved entry state associated with storage location 10. If the saved entry state (e.g., "no portion of pattern found") is the same as the current entry state, the detection program can update its current exit state to equal the saved exit state (e.g., "no portion of pattern found") associated with storage location 10 and avoid having to read or process the data in storage location 10.

Figure 2:
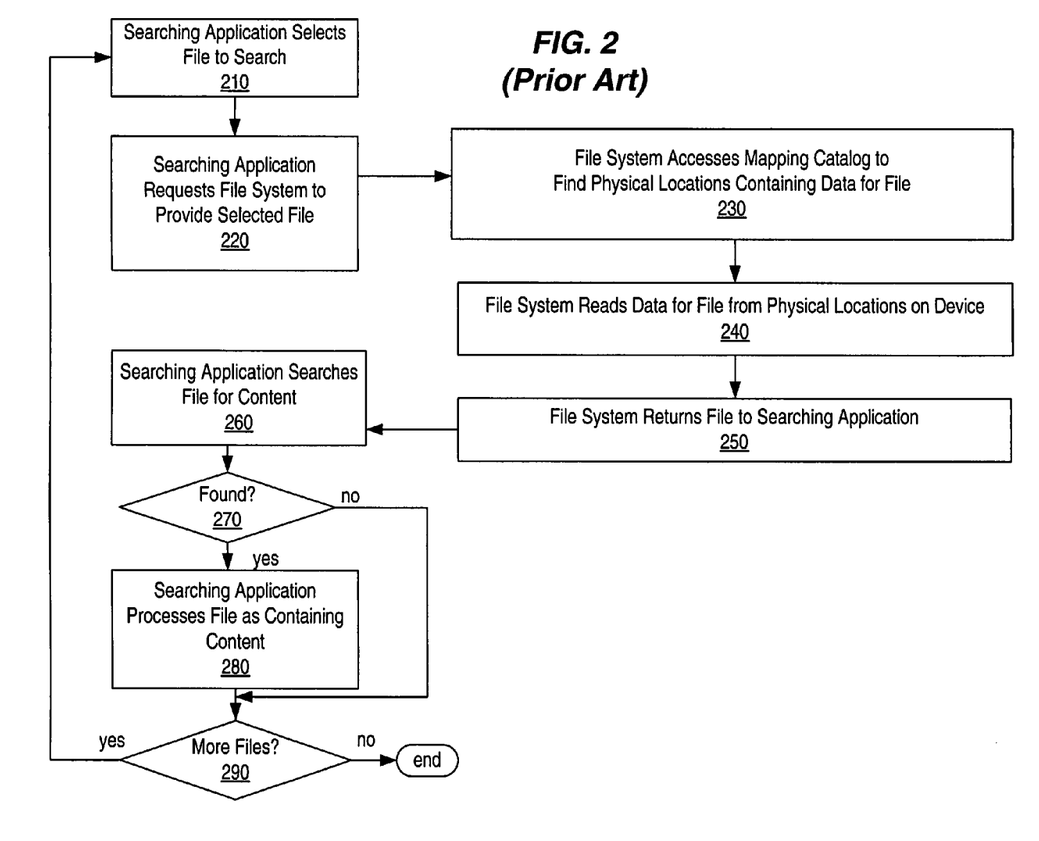
FIG. 2 is a flowchart for a prior art method to search files for a specified pattern of data.

FIG. 2 is a flowchart for a prior art method to obtain and search files for a specified pattern of data. While this flowchart is described as processing a single file, one of skill in the art will recognize that a searching application may select several files to be searched at one time. At 210, the searching application selects a file to be searched. A request for the file is sent to the file system by the searching application, as shown at 220. Control then transitions to the file system for performing operations 230 through 250.

At 230, the file system accesses a mapping catalog, such as the mapping catalog/physical location information 140 of FIG. 1, to find the physical locations on the device for the requested file(s). The file system reads data from the physical locations indicated, as shown at 240. In performing the read operation, the file system may read more than one set of non-contiguous storage locations to obtain all data for the file. A file system performs read operations one file at a time. In the example of FIG. 1, to read FILE1, locations 3 and 4 would be read. To read FILE2, locations 8 through 12 would be read. To read FILE3, storage location 10 would be read (despite the fact that storage location 8 has already been read in constructing FILE2), and then locations 13-15 and 19 would be read. To read FILE4, storage locations 21 through 23 would be read, followed by storage locations 16-18. The read operations for FILE3 and FILE4 are not sequential read operations, but instead skip from one storage location to another to find data for the particular file being read. For sequential storage devices such as tapes, such read operations incur significant overhead.

Referring again to FIG. 2, after the file system has read the data for the file from the physical locations of the device, the file system returns the data in the form of a file to the searching application, as indicated at 250. Communication of a large file from the file system to the searching application also incurs significant overhead.

At 260, control returns to the searching application. Contents of the file are searched for the data pattern of interest in the file, such as a virus signature or keyword. At 270, the searching application determines whether the specific content for which the search is being performed has been found.

If the pattern that is the subject of the search is found, as determined at 270, the searching application then processes the file, as shown at 280. For example, if the content that is the subject of the search is a virus signature, a detection application may pass the file to a repair program that repairs the infected file. At 290, if files remain to be searched, control returns to operation 210, where another file is selected to be searched.

Returning to operation 270, if the content that was the subject of the search is not found in the file, control continues to operation 290. If no files remain to be searched, the searching application has completed the search and the process ends.

In FIG. 2, operations 210 and 220 are performed by the searching application, and then control passes to the file system. The file system performs operations 230 through 250 and returns the file to the searching application. Control then returns to the searching application to perform the actual search. As noted above, the overhead incurred by the file system to read data on a file-by-file basis can significantly affect the time required to perform a search.

Figure 3A:
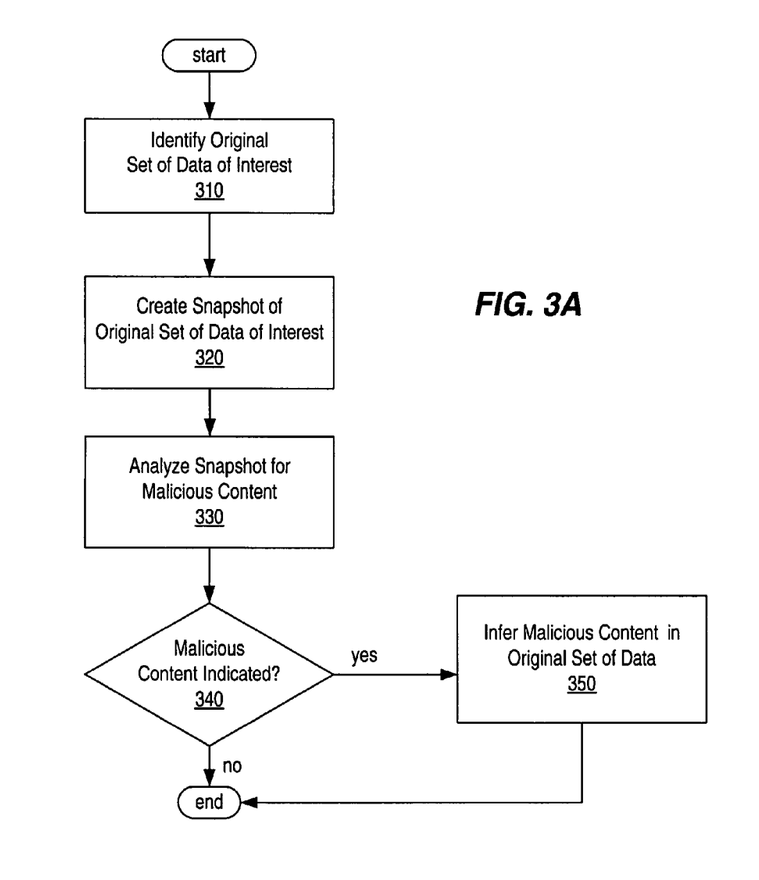
FIG. 3A is a flowchart of a method to search a set of data for a pattern, in accordance with one embodiment of the invention.
Figure 3B:
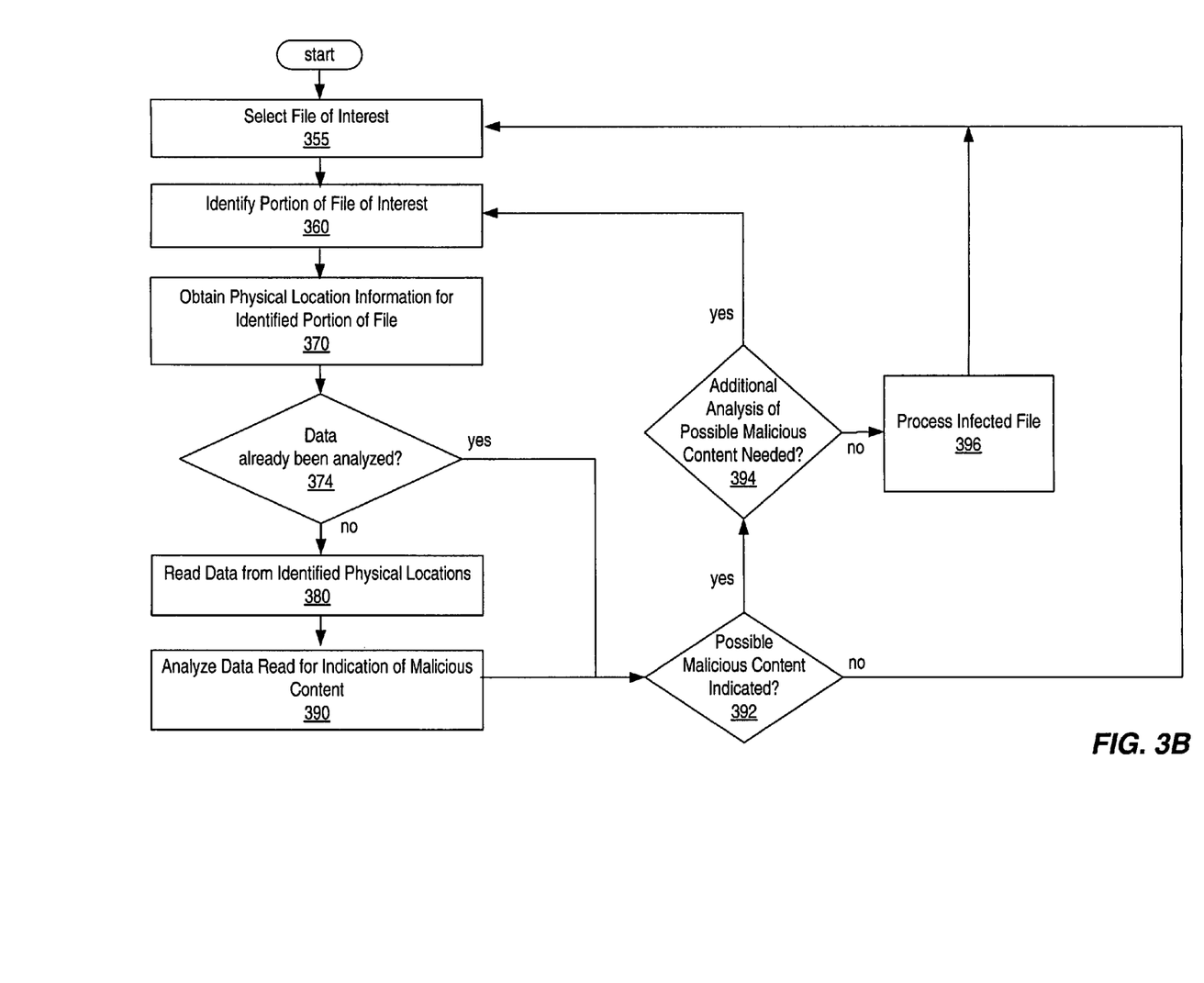
FIG. 3B is a flowchart of a method to analyze a file for a pattern, in accordance with one embodiment of the invention.

FIGS. 3A and 3B are flowcharts of a method to obtain and process at least a portion of a file to detect whether the file contains malicious content, in accordance with one embodiment of the invention. In some embodiments (including the one described in the present example), the detection program processes files by searching for one or more patterns; in other embodiments, the detection program processes files in other ways. A signature file instructs the detection program on how to process files when searching for particular types of malicious content.

Here, the detection program, rather than the file system, reads data directly from the device, without the assistance of the file system. In the description below, the term "detection program" is used to encompass searching instructions, module(s), or means that process files to detect the presence of malicious content. The operations of the flowcharts of FIGS. 3A and 3B are considered to be performed by a detection program, module(s), instructions, or means other than a file system. FIGS. 3A and 3B are described with reference to the data shown in FIG. 1, including storage device 110; the sets of contiguous locations 120A, 120B, and 120C; files FILE1, FILE2, FILE3, and FILE4; pattern 130 (containing the text string 'abcdefg' as an indicator of malicious content for illustrative purposes); and the mapping catalog/physical location information 140.

Referring to FIG. 3A, at 310, the original set of data to be searched for malicious content is identified. This original set of data may be, for example, a primary volume of data for a given application. Control proceeds to 320, where a snapshot of the original set of data of interest is made. In one embodiment, an "instant" snapshot is made, which contains data structures that point to storage locations containing data in the snapshot. Initially, the snapshot may contain only pointers to storage locations. As the primary data are modified, a copy of the original data can be made in a "copy-on-write" operation to another storage location. In some embodiments, a snapshot or other point-in-time copy (e.g., a backup or mirror) is already available for search, and thus operation 320 may have been performed at an earlier point in time during the process (or even before the process begins) in those embodiments.

After creating a snapshot of the original set of data of interest, the snapshot is analyzed for malicious content, as shown at 330. The snapshot is analyzed instead of the live primary set of data in order to speed the detection process. In one embodiment, each file present in the snapshot is analyzed, although the files are not read in their entirety. Further details of analyzing a given file described below with reference to FIG. 3B.

By not using the live set of data, ongoing access to the live set of data is not adversely affected by (and/or does not adversely affect) the detection process. In other words, user access to the live set of data while the analysis is ongoing will not disrupt the analysis of the snapshot. If the live set of data is analyzed instead of the snapshot, user access could potentially disrupt the analysis. To prevent this, the detection application could prevent users from accessing the live set of data while it was being analyzed; however, this disruption of user access would likely be undesirable.

If the analysis performed at 330 indicates that the snapshot has been infected by a malicious content, the files that are infected in the snapshot are considered to have corresponding files that are also infected in the original set of data. If the analysis performed at 330 does not indicate that the snapshot has been infected, the original set of data is considered to have not been infected at this point in time. At this point, detection of malicious content for the original set of data is considered to be complete.

FIG. 3B is a flowchart of the process for analyzing a given file to determine whether the file contains malicious content. At 355, a given file of interest from the snapshot is selected. A portion of the selected file is identified for analysis, as shown at 360. For example, the first 100 bytes of the file may be analyzed for an indication that the file contains malicious content. The portion of the selected file to analyze can be identified by information provided by a signature file, an administrator, or otherwise preconfigured. The portion of the file to analyze can vary (e.g., based on the particular type(s) of malicious content being searched for).

After identifying the portion of the file to be analyzed, the detection program obtains mapping information, also referred to as physical location information, indicating storage locations containing the identified portion of the selected file, as shown at 370. The detection program may use various instructions, module(s), or other means to obtain physical location information for the identified portion(s) of the selected file.

When obtaining the physical location information, the detection program can identify whether the data within a particular portion of a file has already been processed. For example, if single-instancing is implemented, certain files may share at least some (or even all) of the same data. The shared data are stored a single time. In order to avoid processing the same data more than once, the detection program can use the physical location information to identify shared data. The detection program can also keep track of which data have already been analyzed. If a particular set of data has already been analyzed by the detection program and if that set of data appears within another file, the detection program can, in at least some situations, avoid re-processing that data. Thus, as shown at 374, the detection program can, in at least some situations, avoid rereading and reanalyzing data if that data has already been analyzed as part of another file.

Operation 374 can be performed on entire files as well as portions of files. If the physical location information indicates that two files share all of the same information, and if the detection program has already analyzed the data within the file, the detection program can avoid performing any additional analysis of subsequent instances of the file. If the first instance of the file was free from malicious content, the detection program can determine that later instances of the file are also free of malicious content. Similarly, if the first instance of the file contains malicious content, the detection program can determine that later instances of the file also contain malicious content.

If the two files share some but not all data, the detection program can read and analyze some, but not all, of the data in the second file to be analyzed. This can eliminate some redundant processing. For example, assume that the first data block of two files is the same. The detection program can begin by scanning the first data block. The detection program can then store state information (e.g., in a record, log, table, or other appropriate data structure) containing a reference to the data block and the state of the detection engine both before (the entry state) and after (the exit state) scanning that data block. When the second file is processed, the detection program can determine that the first data block has already been processed. Accordingly, the detection program may not need to scan the initial block (e.g., if the current and saved entry states are the same). Instead, the detection program can use the stored state information to immediately enter the state identified by the stored information. If the next data block to be scanned in the file is also the same as in the first file, and if the saved and current entry states for that data block are the same, that second data block can likewise be analyzed by simply accessing the stored state information to obtain the appropriate exit state.

Detection programs often include a decomposition stage that preprocesses a file before analyzing the file for evidence of malicious content. For example, if the file is a zip archive containing many files, the file often needs to be read in its entirety while being decompressed. Then, each extracted file is scanned separately for malicious content. Although the original file needs to be read in its entirety, the detection program may utilize information about single-instancing (contained in the mapping information) to recognize that an extracted file (or data block thereof) is a duplicate of another file or data block and apply analogous optimizations to the above.

At 380, the detection program reads data from the physical locations identified as containing the identified portion(s) of the selected file. Only data in the identified physical locations for the portion(s) of the selected file are read; the remainder (if any) of the selected file is not accessed.

At 390, the detection program analyzes the data read at 380 for any indications of a malicious content. Only the portion of the selected file that was read at 370 is analyzed. At 392, if the portion of the file read does not appear to contain malicious content, another file is selected to be analyzed from the snapshot (at 355). If the analysis of the portion of the file indicates that the file may be infected, the detection program determines whether additional analysis of the possible malicious content is needed, as shown at 394. For example, if analysis of the first 100 bytes indicates that further analysis is warranted, the detection program can again perform operation 360 to identify another portion of the file for analysis. If the analysis has affirmatively detected malicious content, the detection program processes the infected file, as indicated at 396. The detection program can then return to operation 355 to select another file to be analyzed from the snapshot.

While the example described with respect to FIGS. 3A and 3B describes a scenario in which files in a snapshot or other point-in-time copy are analyzed for malicious content, other embodiments may operate differently. For example, in some alternative embodiments, the detection program analyzes live data instead of snapshot. Accordingly, the operations of FIG. 3B can be performed on live data, not a snapshot. Similarly, the physical location information accessed at 370 can describe the physical location of files within the live data, instead of describing the physical location of files within a snapshot.

Additionally, while the example in FIGS. 3A and 3B detect malicious content based on the presence of a particular pattern, other embodiments can detect malicious content in other ways. For example, in alternative embodiments, the detection program can execute a file in a virtual machine instead of scanning the file for a pattern. Furthermore, it is noted that a detection program can perform several different types of analysis on the same or different files when searching for evidence of malicious content. For example, a signature file can indicate that, to detect one type of malicious content, files should be scanned for a particular pattern, while to detect another type of malicious content, files should be executed in a virtual machine. To detect both types of malicious content, the detection application can perform both types of analysis.

Figure 4:
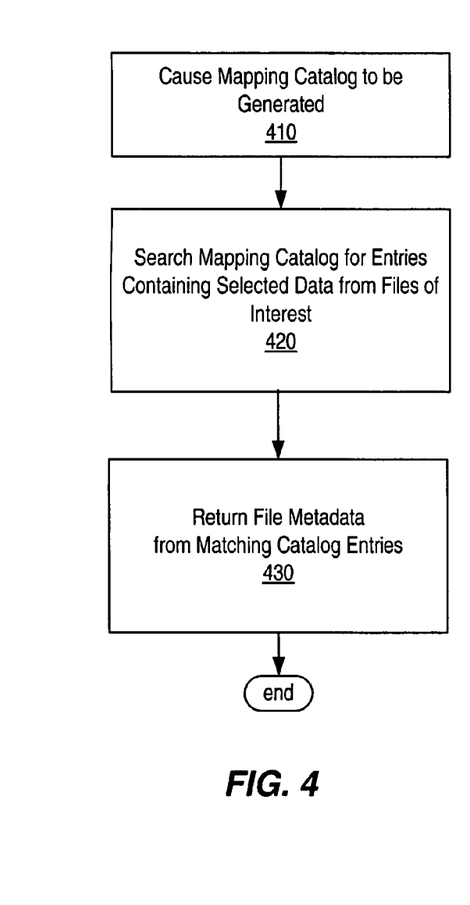
FIG. 4 describes a method to obtain file metadata for portions of files, in accordance with one embodiment of the invention.

FIG. 4 describes a method of obtaining file metadata for portions of files in accordance with operation 370 of the flowchart of FIG. 3B. Operation 380 of FIG. 3B reads data from storage locations. Because the storage locations are read without the assistance of the file system, the detection program has no information about the files to which the data belong. Accordingly, such information (e.g., file metadata) needs to be obtained separately (e.g., by performing operation 370 of FIG. 3B).

In one embodiment, the detection program obtains file metadata via an intermediate application, such as a volume manager or other software in communication with the file system. Examples of intermediate applications that the detection program can use are provided by Veritas Operating Corporation of Mountain View, Calif., and include Veritas Volume Management System and Veritas Mapping Service used in conjunction with Veritas Volume Snapshot Provider or the Veritas Net Backup product.

The method of FIG. 4 begins at 410. Upon receiving a request for file metadata from the detection program, the intermediate application can cause a new mapping catalog to be generated, as shown at 410. One technique for causing a mapping catalog to be generated is described further with reference to FIG. 5 below.

After the mapping catalog is generated, the intermediate application can perform operation 420. Operation 420 searches the mapping catalog for catalog entries that describe the location of data within the files of interest. For example, assume that FILE1 of FIG. 1 is a file of interest and that the mapping catalog corresponds to the first set of storage locations 120 in FIG. 1, which contains locations 0 through 7. Any tuple in the mapping catalog that has a physical location ranging from 0 through 7 will be identified. Only the first tuple (3,4) for FILE1 has physical location information that falls into the range from 0 through 7. Therefore, after searching the mapping catalog, only the first entry for FILE1 will be found.

Each mapping catalog entry stores metadata that includes a file identifier as well as location information that identifies the storage location(s) storing at least a portion of the identified file. Additionally, the metadata can identify which portion of the identified file is stored by the identified storage location(s).

After identifying the mapping catalog entries of interest at 420, the intermediate application can return the file metadata found in the matching catalog entries to the detection program, as shown at 430. In the example above, only file metadata for FILE1 would be returned. When the file metadata for the selected file are returned to the detection program, the detection program processes the metadata (e.g., by performing operation 320 of FIG. 3) and uses the metadata to construct the desired portion(s) of each file of interest (e.g., by performing operation 330 of FIG. 3).

The method of FIG. 4 can be repeated in order to generate and process mapping catalogs for other sets of storage locations. For example, using the example of FIG. 1, after a mapping catalog corresponding to the set of storage locations 120B is generated and searched, catalog entries for FILE2 and FILE3 are identified and file metadata for both FILE2 and FILE3 is returned to the detection program. After a mapping catalog corresponding to the set of storage locations 120C is generated and searched, catalog entries for FILE4 and FILE3 are identified and file metadata for both FILE4 and FILE3 is returned.

Figure 5:
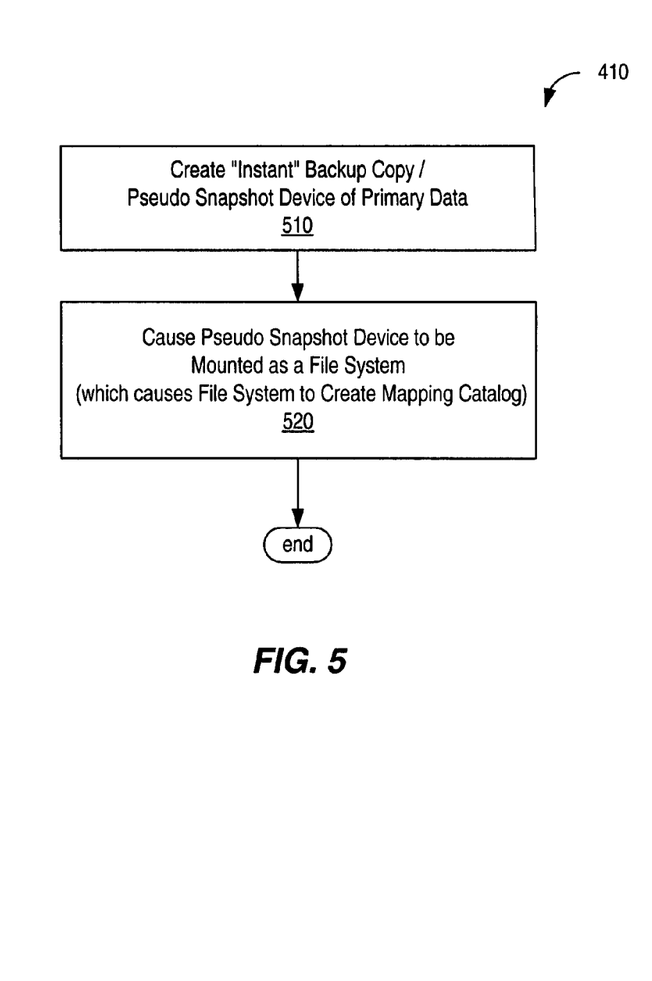
FIG. 5 is a flowchart of one embodiment of a method to cause a mapping catalog to be generated, in accordance with one embodiment of the invention.

FIG. 5 is a flowchart of one embodiment of a method to cause a mapping catalog to be generated. One way to cause a new mapping catalog to be generated is to create an "instant" backup copy of or psuedo-snapshot device containing the primary data, as shown at 510. Creation of the instant backup copy is created may be performed by an intermediate application, such as Veritas Snapshot Provider or Veritas Net Backup, or by another vendor's backup application. At the point in time that the "instant" backup copy is created, all data in the backup copy are identical to the primary data. Consequently, all data blocks can be considered to be shared and none of the file contents need be copied to the backup copy, thereby creating the backup copy "instantly."

The resulting instant backup copy can be treated as any other storage device, including being mounted as a device by the file system, as shown at 520. Mounting a device involves initializing the device to store files for the file system. When the instant backup copy is mounted with all data blocks being shared, the mapping catalog for the backup copy and the primary data can be considered to contain the same physical location information. Consequently, the mapping catalog can be generated very quickly. In one embodiment, the mapping catalog is generated by a mapping service, which uses the mounted file system to map the files to the device.

Mounting the pseudo-snapshot device results in the creation of a new mapping catalog by the file system for the pseudo-snapshot device. The new mapping catalog identifies files and the physical location information for those files on the pseudo-snapshot device. Initially, the newly-created mapping catalog includes the same physical location information as the existing mapping catalog for the primary data. Consequently, creation of the new mapping catalog does not require reading actual file contents and can be performed very quickly. The physical location information for the files can then be compared to the storage locations that have been or will be read in order to identify which of those storage locations store data within a file of interest.

In the embodiment of FIG. 5, the file system is not requested to provide the file or to read any of the files' contents. All that is requested of the file system is to mount the pseudo-snapshot device. As a result of mounting the pseudo-snapshot device, the file system can cause the mapping catalog to be generated for the pseudo-snapshot device. In one embodiment, the file system uses a mapping service (e.g., Veritas File System (VxFS) uses Veritas Mapping Service (VxMS)) to map the files to the device and generate the mapping catalog. Causing the file system to mount the pseudo-snapshot device can be a much faster operation than having the file system use an existing mapping catalog to read the data from the device on a file-by-file basis, since the file system overhead required to mount the pseudo-snapshot device is much less than that to read the data on a file-by-file basis.

In this embodiment, the pseudo-snapshot device only needs to be mounted for a short period of time while the data are read and the file metadata accessed. Files can be constructed using the file metadata. When a set of storage locations has been read and searched and it is confirmed that the file metadata have not changed, the file system can remove the pseudo-snapshot device.

Embodiments of the present invention can provide many advantages. Because data can be read without the overhead of a file system, large amounts of data can be read from a device much more quickly. Patterns such as virus signatures or keyword matches can therefore be discovered much more quickly. Furthermore, because the mapping information identifies situations in which single-instancing has been employed, storage locations belonging to more than one file are read only once, further improving the performance of the content search.

Other Embodiments

While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

Figure 6:
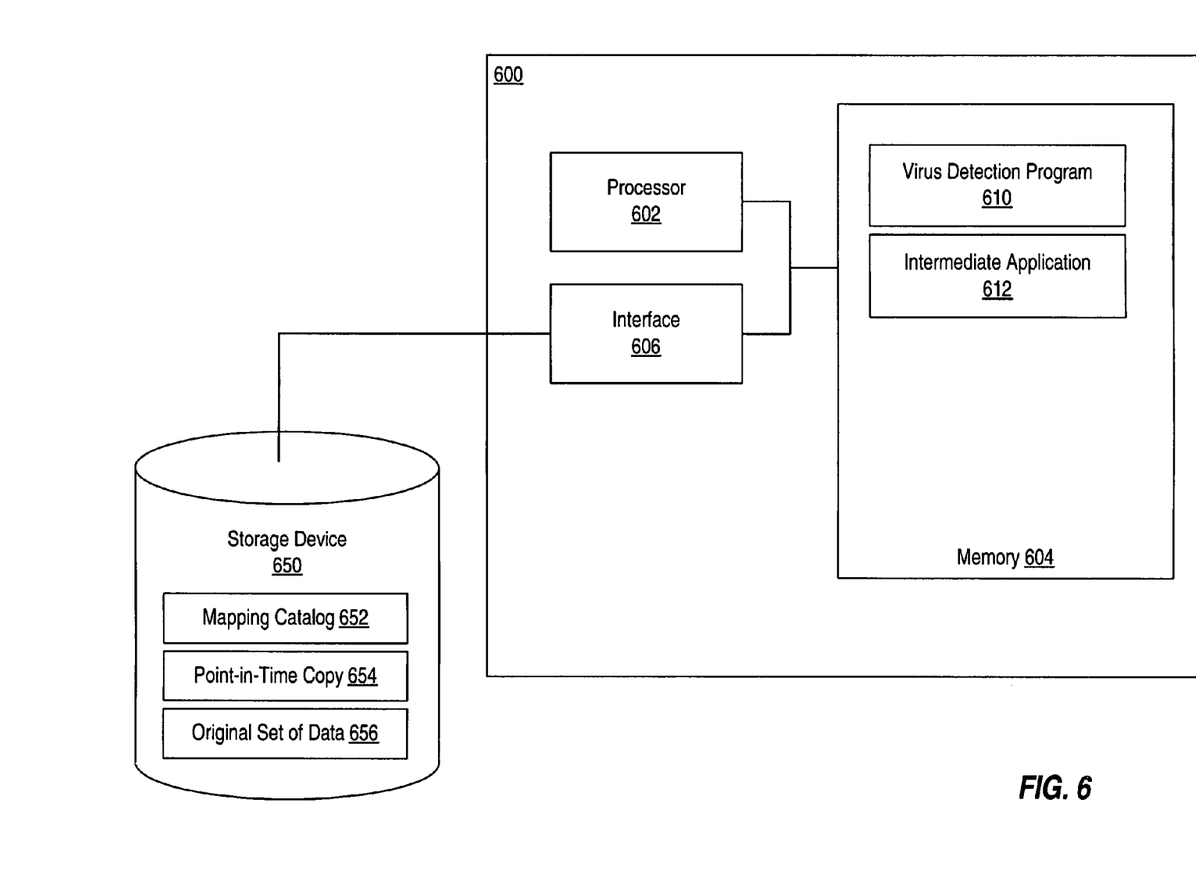
FIG. 6 is block diagram of a computer system, according to one embodiment of the invention.

FIG. 6 is a block diagram of a computing device 600. As illustrated, computing device 600 includes one or more processors 602 (e.g., microprocessors, PLDs (Programmable Logic Devices), or ASICs (Application Specific Integrated Circuits)) configured to execute program instructions stored in memory 604. Memory 604 can include various types of RAM (Random Access Memory), ROM (Read Only Memory), Flash memory, MEMS (Micro Electro-Mechanical Systems) memory, magnetic core memory, and the like. Memory 604 can include both volatile and non-volatile memory. Computing device 600 also includes one or more interfaces 606. Processor 602, interface 606, and memory 604 are coupled to send and receive data and control signals by a bus or other interconnect.

Interface 606 can include a network interface to various networks and/or interfaces to various peripheral buses. Interface 606 can also include an interface to one or more storage devices, such as storage device 650. In this example, storage device (which can itself be an array of individual storage devices) stores various information, such as a mapping catalog 652, a snapshot or other point-in-time copy 654, and an original set of data 656. Point-in-time copy 654 is a copy of the original set of data 656. Mapping catalog 652 can be generated by intermediate application 612 and is used to determine which storage locations within point-in-time copy 654 contain data within a particular portion of a file of interest.

In this example, program instructions and data executable to implement all or part of a detection program 610 and/or an intermediate application 612 are stored in memory 604. It is noted that in alternative embodiments, intermediate application 612 can be implemented separately (e.g., on a storage controller such as an array controller, tape drive controller, or hard drive controller) from detection program 610. The program instructions and data implementing detection program 610 and/or an intermediate application 612 can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order to be executed by processor 602, the instructions and data can be loaded into memory 604 from the other computer readable medium. The instructions and/or data can also be transferred to computing device 600 for storage in memory 604 via a network such as the Internet or upon a carrier medium. The present invention has been described in the context of fully functional computer systems; however, those skilled in the art will appreciate that the present invention is capable of being distributed as a program product in a variety of forms.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of operations are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   receiving mapping information corresponding to a set of data, wherein the mapping information maps at least a portion of a file to a physical storage location;
   reading the portion of the file from the physical storage location to which the mapping information mapped the at least the portion of the file, wherein the at least the portion of the file is read from the physical storage location without accessing a file system;
   analyzing the portion of the file for evidence of malicious content, wherein the receiving, the reading, and the analyzing are performed by a detection program executing on a computing device;
   determining that a portion of a second file contains data that are shared with the portion of the file, based on the mapping information indicating that the portion of the second file is stored in a same physical location as the portion of the file,
      wherein the determining comprises comparing physical location information for the portion of the second file with physical location information for the portion of the file and the first file and the second file are different files; and
      in response to the determining:
         detecting that the detection program has analyzed the portion of the file and
         using a result of analysis of the portion of the file as a result of analysis of the portion of the second file,
         wherein the using the result of the analysis of the portion of the file as a result of analysis of the portion of the second file comprises:
         comparing one or more entry states associated with the portion of the file with a current entry state, wherein the current entry state is a state of a virtual machine before the virtual machine processes the portion of the second file;
         accessing information identifying an exit state, wherein the information is associated with the portion of the file and an entry state matching the current entry state; and
         entering the exit state identified by the information, without processing the portion of the second file in the virtual machine.

2. The method of claim 1, wherein the physical storage location is one of a plurality of physical storage locations storing a point-in-time copy of a plurality of files managed by the file system.

3. The method of claim 1, further comprising:
   causing a mapping catalog to be generated; and
   searching the mapping catalog for an entry, wherein the entry identifies one or more storage locations storing the portion of the file.

4. The method of claim 3, wherein the causing the mapping catalog to be generated comprises: making a copy of the set of data; and causing the copy of the set of data to be mounted as a device by a file system.

5. A computer program product comprising:
   a computer readable medium tangibly embodying program instructions executable to implement a detection program, wherein the detection program is configured to:
      receive mapping information, wherein the mapping information maps at least a portion of a file to a physical storage location;
      read the portion of the file from the physical storage location to which the mapping information mapped the at least the portion of the file, wherein the at least the portion of the file is read from the physical storage location without accessing a file system; and
      analyze the portion of the file for evidence of malicious content; and wherein the program instructions are further executable to:
      determine that a portion of a second file contains data that are shared with the portion of the file, based on the mapping information indicating that the portion of the second file is stored in a same physical location as the portion of the file,
      wherein a determination comprises comparing physical location information for the portion of the second file with physical location information for the portion of the file, and
      the first file and the second file are different files; and
      in response to the determination
         detect that the detection program has analyzed the portion of the file, and
         use a result of analysis of the portion of the file as a result of analysis of the portion of the second file,
         wherein using the result of the analysis of the portion of the file as a result of analysis of the portion of the second file comprises:
         comparing one or more entry states associated with the portion of the file with a current entry state, wherein the current entry state is a state of a virtual machine before the virtual machine processes the portion of the second file;
         accessing information identifying an exit state, wherein the information is associated with the portion of the file and an entry state matching the current entry state; and
         entering the exit state identified by the information, without processing the portion of the second file in the virtual machine.

6. The computer program product of claim 5, wherein the physical storage location is one of a plurality of physical storage locations storing a point-in-time copy of a plurality of files managed by the file system.

7. A system comprising:
   a processor; and
   a memory coupled to the processor, wherein the memory stores program instructions executable by the processor to implement a detection program, wherein the detection program is configured to:
      receive mapping information, wherein the mapping information maps at least a portion of a file to a physical storage location;
      read the portion of the file from the physical storage location to which the mapping information mapped the at least the portion of the file, wherein the at least the portion of the file is read from the physical storage location without accessing a file system; and analyze the portion of the file for evidence of malicious content; and wherein the program instructions are further executable to:

determine that a portion of a second file contains data that are shared with the portion of the file, based on the mapping information indicating that the portion of the second file is stored in a same physical location as the portion of the file, wherein a determination comprises comparing physical location information for the portion of the second file with physical location information for the portion of the file, and the first file and the second file are different files; and in response to the determination
    detect that the detection program has analyzed the portion of the file, and use a result of analysis of the portion of the file as a result of analysis of the portion of the second file, wherein using the result of the analysis of the portion of the file as a result of analysis of the portion of the second file comprises:

comparing one or more entry states associated with the portion of the file with a current entry state, wherein the current entry state is a state of a virtual machine before the virtual machine processes the portion of the second file;

accessing information identifying an exit state, wherein the information is associated with the portion of the file and an entry state matching the current entry state; and entering the exit state identified by the information, without processing the portion of the second file in the virtual machine.

8. The system of claim 7, wherein the physical storage location is one of a plurality of physical storage locations storing a point-in-time copy of a plurality of files managed by the file system.

9. A system comprising:

computer readable storage means for storing mapping information;

means for receiving the mapping information, wherein the mapping information maps at least a portion of a file to a physical storage location;

means for reading the portion of the file from the physical storage location to which the mapping information mapped the at least the portion of the file, wherein the at least the portion of the file is read from the physical storage location without accessing a file system;

means for analyzing the portion of the file for evidence of malicious content;

means for determining that a portion of a second file contains data that are shared with the portion of the file, based on the mapping information indicating that the portion of the second file is stored in a same physical location as the portion of the file, wherein a determination comprises comparing physical location information for the portion of the second file with physical location information for the portion of the file, and the first file and the second file are different files; and means for detecting, in response to the determination, that the detection program has analyzed the portion of the file, and in response to the determining, using a result of analysis of the portion of the file as a result of analysis of the portion of the second file, wherein a detection program on a computing device comprises the means for receiving, the means for reading, and the means for analyzing, wherein using the result of the analysis of the portion of the file as a result of analysis of the portion of the second file comprises:

comparing one or more entry states associated with the portion of the file with a current entry state, wherein the current entry state is a state of a virtual machine before the virtual machine processes the portion of the second file;

accessing information identifying an exit state, wherein the information is associated with the portion of the file and an entry state matching the current entry state; and entering the exit state identified by the information, without processing the portion of the second file in the virtual machine.

* * * * *